United States Patent Office 3,017,649
Patented Jan. 23, 1962

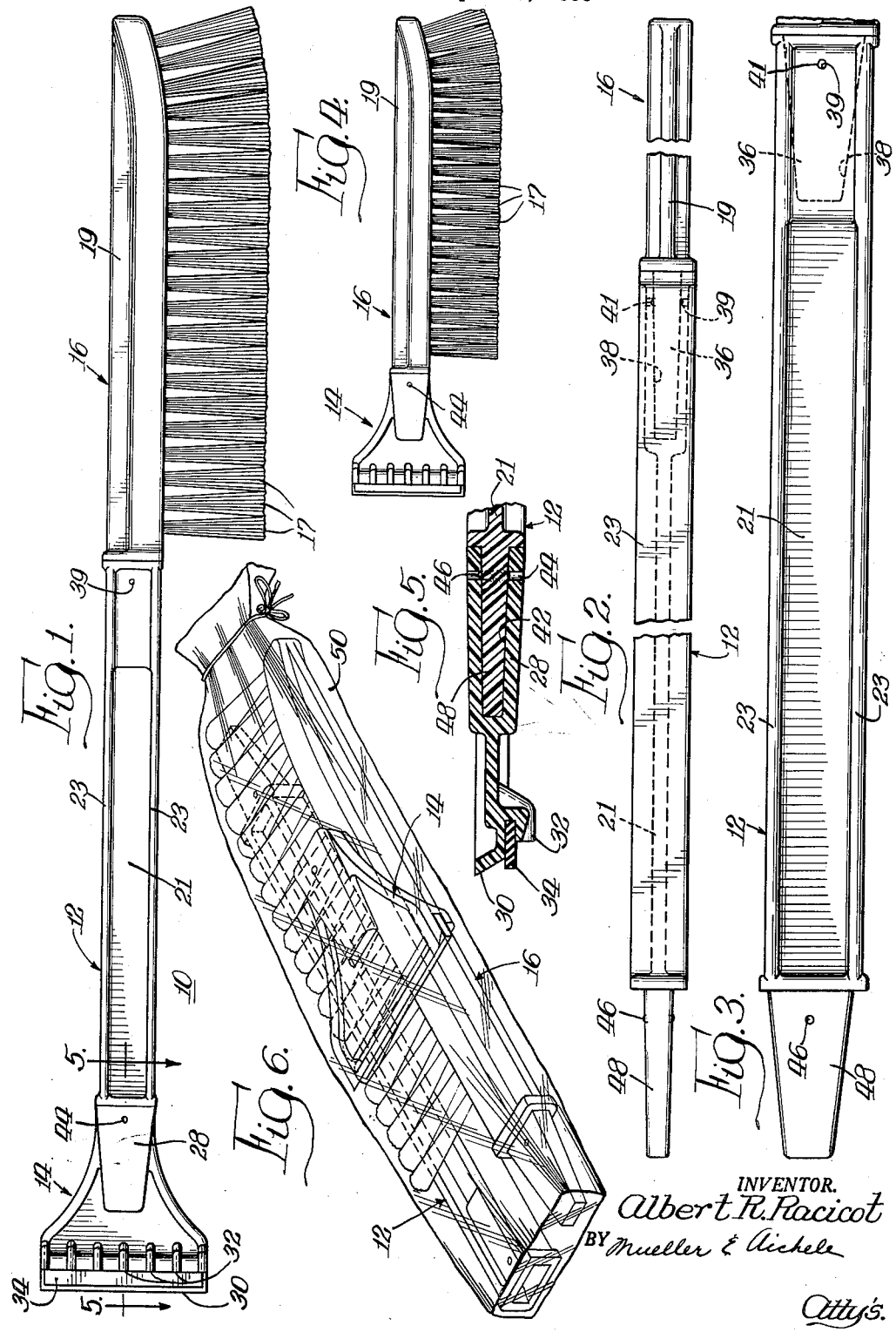

3,017,649
MULTI-PART COLLAPSIBLE SNOW AND ICE REMOVING DEVICE
Albert R. Racicot, Aurora, Ill., assignor to National Brush Company, Aurora, Ill., a corporation of Illinois
Filed Apr. 4, 1956, Ser. No. 576,111
3 Claims. (Cl. 15—105)

This invention relates to snow and ice removal devices and more particularly to a combination tool for use in clearing automobile windows or removing snow from auto bodies.

Motorists frequently find it necessary to remove ice and snow accumulated on auto windows or bodies. In most instances it is desirable to provide a long handle on a removal device used in such an operation so that the user may reach at least halfway across the car width without otherwise touching the auto body, which may be dirty or wet with snow. A device having a handle of proper length, however, may be difficult to store conveniently in the car, particularly when wet after use. For example, there may be insufficient space under the front seat, and it normally is inconvenient or difficult for the driver to reach such a device if it is necessary to store the same on the rear window ledge.

Accordingly, it is an object of this invention to provide a long handled snow removal device which may be easily stored in a small space convenient to the driver, such as the auto glove compartment.

Another object is to provide a long handled, multipart snow and ice removal device which is capable of being assembled with different attachments so that it may be used for removing sludge and ice from the windows of an outomobile or other vehicle, for removing snow alone, or for both removal operations with the one tool or device.

A feature of the invention is the provision of a separate scraper and brush handle part, each having interlocking sections, and an elongated handle having respective ends to which the brush handle part and scraper may be fastened by such interlocking sections to form a long handled snow removal device which can be disassembled when not in use and stored in a relatively compact form, for example, in a suitable sack.

Another feature is the provision of such a snow removal device wherein matable locking sections of the device are engageable with one another as well as with particular ends of a relatively long handle so that the device can be used with a long or short handle.

Further objects, features, and the attending advantages thereof will be apparent upon consideration of the following description when taken in conjunction with the accompanying drawings in which:

FIG. 1 is a view of the brush and scraper device in assembled form;

FIG. 2 is a plan view of the device with the scraper removed;

FIG. 3 is an elevation view of the handle of the device;

FIG. 4 is a view of the brush and scraper secured to one another;

FIG. 5 is a sectional view along the line 5—5 of FIG. 1; and

FIG. 6 is a view of the device when disassembled and packaged for storage.

The invention provides a snow and ice removal device including a brush handle detachably secured to one end of a long handle and a scraper and squeegee detachably secured to the other end. Attachment to the handle is made by means of a tongue on one part and a receiving aperture of the other part. The tongue may include a projecting part which is adapted to engage an opening in the wall of the receiving aperture for locking purposes. After use, the device may be disassembled and stored in a plastic bag to confine any retained moisture. When detached, both the brush and the scraper may be used separately. They may also be fitted to one another to form a short handled dual function device, or the brush or the scraper may be separately secured to the long handle and used in that manner.

FIG. 1 shows the snow and ice removal device 10 which includes an elongated handle 12, a scraper 14 and a brush 16. The brush 16 includes plastic bristles 17 set in a molded plastic back 19. This brush may be used for whisking snow from the exterior of an automobile. Handle 12 includes a thin central section 21 bounded by an enlarged edge flange 23 to give desired strength to the handle. This elongated handle may be formed of molded plastic and, of course, permits a user to reach across an auto body without otherwise coming into contact therewith.

The device 10 further includes the scraper 14, also preferably formed of molded plastic, which has a handle portion 28 and a transverse chisel-like edge 30 (FIG. 5) for scraping ice from windows and the like. The scraper 14 also has a series of raised portions 32 extending perpendicular to the transverse edge 30 to form a rake for loosening ice. A channel formed in the scraper between the edge 30 and the rake portions 32, contains a pliant squeegee member 34 used for squeezing water from a window.

FIGS. 2 and 3 show the back 19 of brush 16 which includes a tapered projection, or tongue, 36 extending from one end of the back thereof and which tongue 36 fits into an oppositely tapered opening 38 in one end of the handle 12. An aperture 39 through the handle receives the ends of a projection 41 which extends from opposite sides of tongue 36 in order to lock the male and female parts of the brush and handle in fixed relation.

Similarly, as shown in FIGS. 2, 3 and 5 the handle 28 of the scraper has a tapered opening 42 which is exactly like opening 38 in the elongated handle. Handle 28 of the scraper also includes a transverse aperture 44 to receive the ends of a projection 46 in the tapered tongue 48 of the other end of the handle 12. Tongue 48 corresponds in configuration exactly to tongue 36 and, as shown in FIG. 1, the brush and scraper may be locked to opposite ends of the elongated handle to form the completely assembled, long-handled device.

FIG. 6 shows the device completely disassembled and disposed within a plastic bag 50 for convenient storage in the glove compartment of an automobile. Since the device may be wet after use, and also to maintain all of the components together for reassembly and reuse, it is deemed preferable to store the parts in this manner. It is also preferable that the elongated handle 12 and the brush 16 be constructed to have a length which would just fit the glove compartment of an auto so that when assembled the device will have a desirably long length to facilitate reaching as previously explained. The brush and scraper may, of course, be used as a long handled unit as shown in FIG. 1 or as a short handled unit as shown in FIG. 4 where the handle is provided by sections of the scraper handle and brush back. Furthermore, the brush and scraper can each be used separately and unattached if this is deemed desirable so that greater pressure can be put on the scraper in a given situation and/or so that two persons can use the separate snow removal parts of the device at one time. Obviously, the handle can also be used with only the brush or only the scraper if this is desirable, or more than one handle (12) can be used to provide a device with very great handle length.

I claim:
1. A collapsible device for removing snow and ice from an auto vehicle window, said device being rigid and elongated when completely assembled for use in reaching all window portions including the remote portions thereof and being collapsible into a disassembled condition for storage in the vehicle glove compartment after the device has been used, said device including in combination, scraper and squeegee means having an outwardly flared portion with a transverse chisel edge at the maximum flared dimension thereof and having a squeegee spaced rearwardly from said chisel edge, with said flared portion being progressively reduced in a transverse dimension and merging longitudinally into a handle portion having a longitudinally extending cavity therein which is rectangular in transverse cross-section, first handle means having a protuberance at one end which is of a cross-section corresponding to that of said cavity telescopingly connectible to the scraper and squeegee means at said handle-portion-cavity so that said scraper and squeegee means and said handle portion are maintained together and against movement including twisting relative to one another, and with said handle portion merging into said first handle means when it is assembled and facilitating grasping and manipulating of the device, and second handle means separate from said scraper means and said first handle means and having an elongated portion, said elongated portion of said second handle means and said first handle means including complementary connecting portions adapted to be fitted together in a rigid bayonet-type connection but in a removable relation, with said scraper and squeegee means and said first and said second handle means each individually being of a size and in the collapsed condition of the device being packaged in an overall size such that the package can be received in an auto vehicle glove compartment for convenient storage thereof within a vehicle and for ready accessibility when snow and ice collect on the outside of an auto vehicle window and which is adapted for ready assembly to be used for removing the snow and ice from the vehicle window.

2. A three-part device with the parts thereof being connectible to form a single long-handled snow and ice removal tool for reaching adjacent and remote window portions of an auto vehicle and being disconnectible to form optionally a one-part or a two-part short-handled snow and ice removal means for reaching less remote window portions, and said device being further disconnectible into three parts for storage in the vehicle in a relatively small space, said three-part device including in combination, an elongated plastic handle part having a tapered tongue at one end thereof which is rectangular in transverse cross-section and having enlarged flange portions along the outer longitudinal edges of said part to facilitate grasping of the same, a scraper and rake plastic part having an outwardly flared body portion at one end and having a grasping portion at the other end thereof extending longitudinally into the outwardly flared body portion and terminating at said body portion, said grasping portion having an inwardly tapered bore at one end of rectangular shape in transverse cross-section and of a size adapted to receive and lock said tapered tongue therein for connecting together said scraper and rake part and said elongated plastic handle part to permit the use of the connected device when grasping said elongated plastic handle part, said parts being connected together at said bore and tongue against relative twisting movement when the device is in use, and an additional plastic part having an end portion adapted to be removably connected to the other end portion of said elongated handle part, with corresponding structure at said end portion of said additional part and said other end of said handle part to accomplish such removable connection and prevent any twisting movement between said handle and additional parts additional parts relative to one another while the device is in use, said handle part and said scraper and rake part and said additional part each being of a size in length and width and thickness so that when disassembled they will fit within an envelope, which envelope with the device therein in turn is small enough so that it will fit into the glove compartment of the auto vehicle.

3. A three-part device with the parts thereof being connectible to form a single long-handled snow and ice removal tool for reaching adjacent and remote window portions of an auto vehicle and being disconnectible to form optionally a one-part or a two-part short-handled snow and ice removal means for reaching less remote window portions, and said device being further disconnectible into three parts for storage in the vehicle in a relatively small space, said three-part device including in combination, an elongated plastic handle part having a tapered tongue at one end portion thereof which is rectangular in transverse cross-section and having enlarged flange portions along the outer longitudinal edges of said part to facilitate grasping of the same, a scraper and rake plastic part having an outwardly flared body portion at one end and having a grasping portion at the other end thereof extending longitudinally into the outwardly flared body portion and terminating at said body portion, said grasping portion having an inwardly tapered bore at one end of rectangular shape in transverse cross-section and of a size adapted to receive and lock said tapered tongue therein for connecting together said scraper and rake part and said elongated plastic handle part to permit the use of the connected device when grasping said elongated plastic handle part, said parts being connected together at said bore and tongue against relative twisting movement when the device is in use, and an additional plastic part having an end portion adapted to be removably connected to the other end portion of said elongated handle part, one of said two last mentioned end portions having a tapered tongue which is rectangular in transverse cross-section and the other of said last mentioned end portions having an inwardly tapered bore of rectangular shape in transverse cross-section and of a size adapted to receive and lock said tapered tongue therein to accomplish the removable connection and prevent any twisting movement in said corresponding parts relative to one another while the device is in use, said handle part and said scraper and rake part and said additional part each being of a size in length and width and thickness so that when disassembled they will fit within an envelope, which envelope with the device therein in turn is small enough so that it will fit into the glove compartment of the auto vehicle.

References Cited in the file of this patent
UNITED STATES PATENTS

| | | |
|---|---|---|
| D. 170,460 | Hauser | Sept. 22, 1953 |
| 607,105 | Wilkinson | July 12, 1898 |
| 657,011 | Schilz | Aug. 28, 1900 |
| 1,209,789 | Wilson | Dec. 26, 1916 |
| 1,469,348 | Wickberg | Oct. 2, 1923 |
| 1,741,143 | Chin | Dec. 31, 1929 |
| 1,776,443 | Martin | Sept. 23, 1930 |
| 1,974,027 | Knick | Sept. 18, 1934 |
| 2,277,528 | Osborn | Mar. 24, 1942 |
| 2,574,654 | Moore | Nov. 13, 1951 |
| 2,618,005 | Harshbarger | Nov. 18, 1952 |
| 2,639,454 | Dory | May 26, 1953 |
| 2,719,316 | Hauser | Oct. 4, 1955 |
| 2,792,584 | Fryda | May 21, 1957 |
| 2,810,150 | Ellman | Oct. 22, 1957 |

FOREIGN PATENTS

| | | |
|---|---|---|
| 82,274 | Norway | Aug. 17, 1953 |
| 154,683 | Great Britain | Nov. 29, 1920 |

OTHER REFERENCES

Advertisement in "Hardware Age," Nov. 10, 1955, page 22.